3,629,465
PRESERVATIVES FOR AQUEOUS SYSTEMS
Milton Manowitz, Fair Lawn, N.J., George R. Walter, Racine, Wis., and Stephen A. Foris, Toms River, N.J., assignors to Givaudan Corporation, Clifton, N.J.
No Drawing. Continuation-in-part of application 573,845, Aug. 22, 1966. This application Dec. 23, 1968, Ser. No. 786,453
Int. Cl. A01n 9/20; C02b 3/08; C09d 5/14
U.S. Cl. 424—349
6 Claims

ABSTRACT OF THE DISCLOSURE

The use of (1,2-dibromo-2-nitroethyl) benzene (I) and β-bromo-β-nitrostyrene (II) as preservatives for aqueous systems normally subject to spoilage is disclosed. Examples showing results obtained in preserving cutting oils, cosmetic lotions and creams, fuel oil, latex emulsions, paints, industrial cooling water, water used in pulp and paper manufacturing, flood water used in secondary oil recovery, and starch-base adhesives are given.

CROSS-REFERENCE TO RELATED U.S. PATENT APPLICATION

The present application is a continuation-in-part application of our co-pending application, Ser. No. 573,845, filed Aug. 22, 1966, now abandoned.

BACKGROUND OF THE INVENTION

The present invention relates to processes and compositions for preserving aqueous systems against the deleterious action of bacterial, fungi and algae.

It is well known that various aqueous systems containing metabolizable components, either in trace or major quantities, are normally susceptible to attack and degradation by microorganisms. Examples of such compositions are cutting oils, cosmetic compositions such as lotions and creams, fuel oil, textile emulsions, latex emulsions and paints, starch-base adhesives, industrial cooling water, emulsion waxes, water used in pulp and paper manufacture (so-called "process" water, e.g., "white water"), and flood water used in secondary oil recovery methods.

Many useful preservatives have been proposed for compositions subject to attack as indicated, but known preservatives often have failed to provide satisfactory protection or suffer from other disadvantages such as stability, toxicity, etc. For example, many preservatives, such as phenols and quaternary ammonium compounds, are inactivated by the presence of nonionic surfactants in specific formulations. Others are trapped in the oil phase of oil and water formulations and fail to inhibit microbial growth. A major deficiency of many antimicrobial compounds is their low activity against principal spoilage organisms, particularly *Pseudomonas aeruginosa* and *Escherichia coli*.

SUMMARY OF THE INVENTION

We have now found, surprisingly, that the unusual requirements for preservatives are satisfied by two compounds which have been known for some time. Even more surprisingly, it has been found that the effectiveness of these compounds in question is many times that of known preservatives. In other words, much smaller amounts of the compounds of the present invention as compared with known preservatives, are used to obtain equivalent preservative effects.

The active compounds found to be useful in accordance with this invention are I (1,2-dibromo-2-nitroethyl) benzene and II (β-bromo-β-nitrostyrene). The structural formulae of I and II may be represented as follows:

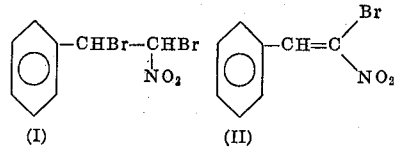

DESCRIPTION OF THE PREFERRED EMBODIMENTS

It has been found that the active compounds of this invention are effective, in general, against a broad spectrum of microorganisms which attack the water-containing compositions and systems described herein. Examples of some of these microorganisms are:

Gram positive bacteria

Staphylococcus aureus
Staphylococcus epidermidis
Streptococcus faecalis
Streptococcus agalactiae Gram negative bacteria Escherichia coli
Pseudomonas aeruginosa
Proteus vulgaris
Aerobacter aerogenes
Salmonella typhosa Yeasts Candida albicans
Saccharomyces cerevisiae Molds Penicillium piscarium
Penicillium funiculosum
Aspergillus niger
Aspergillus flavus
Trichophyton mentagrophytes Algae Chlorella vulgaris
Chlamydomonas pseudagloe
Scenedesmus naegelii Minor amounts of the preservatives of this invention are sufficient to prevent spoilage of various compositions caused by bacteria, algae and higher fungi. Quantities as low as 0.00005% to 0.05% by weight of the total composition have given satisfactory results. The use of greater quantities, while feasible, is recommended only in compositions of very unusual properties. The preservatives are active both in acid and basic media and in the presence of substantial amounts of nonionic surfactants.

This invention may be practiced by adding the preservatives to the compositions in any suitable manner. For example, the incorporation can be effected either during hte preparation of the composition or after the composition has been prepared. In the case of oil-in-water systems, the preservatives may be dissolved initially in the oil phase before preparation of the final product or by adding them directly to the finished emulsified composition. The preservatives may be added directly to the products or as a solution in a suitable solvent such as acetone, alcohol, benzene, carbon tetrachloride, etc.

The active compounds of this invention may be prepared from β-nitrostyrene by general methods of bromination and dehydrobromination reported in the literature. Bromination was accomplished by adding equimolar quantities of bromine to β-nitrostyrene dissolved in suitable solvents such as chloroform, acetic acid, etc. at ambient to reflux temperatures for periods of fifteen minutes to four hours. To form β-bromo-β-nitrostyrene, the resulting dibromonitroethyl benzene was dehydrobrominated in suitable solvents such as chloroform, ethanol, or acetic acid by the addition of dehydrobromating agents such as pyridine or potassium carbonate at ambient to reflux temperatures. General methods of preparation are illustrated by the following examples:

To a solution of 14.9 g. (0.1 M) of β-nitrostyrene in 50 ml. of chloroform was added 16.0 g. (0.1 M) of bromine. The solution was refluxed for three hours, the chloroform was evaporated under reduced pressure, and the solid residue was recrystallized from hexane giving white crystals of (1,2 - dibromo-2-nitroethyl) benzene, M.P. 86.5–87°.

To a solution of 31 g. (0.1 M) of (1,2-dibromo-8-nitroethyl) benzene in 100 ml. of chloroform was added 8 g. (0.1 M) of pyridine. The solution was refluxed for one hour, the chloroform evaporated under reduced pressure, and the solid residue recrystallized from methanol giving yellow crystals of β-bromo-β-nitrostyrene, M.P. 67–68° (Calculated C–42.13, H–42.45; Found C–2.65, H–2.69).

EXAMPLE 1

Cutting oil emulsions are widely used in the high-speed metal-cutting industries for their cooling, lubricating and anticorrosive properties. These systems are quite susceptible to bacterial decomposition, producing obnoxious odors and potential hazards unless adequate protected by the addition of an effective preservative.

A cutting oil emulsion normally consists of 1% to 20% of an emulsifiable cutting oil in water. Emulsifiable cutting oils are composed of petroleum oils mixed with emulsifying agents such as a soap of petroleum uslfonate, fatty acid, tall oil, or rosin.

Detailed descriptions of these systems, their microbiological problems and difficulties in their preservation can be found in: Bennet, E. O., Soap Chem. Specialties, 32, 46 (1956). Fabian, F. W. and Pivnick, H., Applied Microbiology, 1, 201 (1953).

The compounds of our invention are very effective, long-acting preservatives for cutting oil emulsions. Our compounds can be added by dissolving them in the concentrated cutting oil, which is then diluted with water to form the cutting oil emulsion, or they may be added to the final emulsion as asolid or dissolved in a solvent such as dimethylformamide, alcohol, acetone, etc.

The following tests demonstrate the effectiveness of our compounds as preservatives for cutting oil emulsions. A six percent solution, by weight, of the compounds I and II were separately prepared in dimethylformamide and serially diluted with dimethylformamide to give a range of concentrations. Aliquots (0.1 ml.) of the serial dilution series were added to 12 ml. of the cutting oil emulsion prepared by diluting one part of Kutwell® 30 cutting oil with 100 parts of distilled water containing 0.1% peptone (Difco). Kutwell 30, manufactured by Humble Oil and Refining Co. is an emulsifiable sulfonated lubricant cooling solution used in the turning, cutting and grinding of metals. Samples were inoculated with one drop (0.05 ml.) of a 24 hour A.O.A.C. broth culture of Ps. aeruginosa diluted 1–10 in sterile distilled water and incubated at 28° C. on a mechanical shaker. Survival of the inoculum was determined at weekly intervals for a total time of four weeks. Samples were reinoculated when sampled. Thus each preparation had undergone four inoculations by the end of the fourth week. Survival of the inoculum was determined by streaking one 4 mm. loopful (0.01 ml.) of emulsion onto the surface of trypticase glucose extract agar (Baltimore, Bioigoical Laboratories, Baltimore, Md.) containing 0.005% triphenyltetrazolium cholride. Sterile plates were regarded as protection of the system and the corersponding inhibiting concentration of test compound was recorded.

Table I presents the results of these tests with Compounds I and II.

TABLE I

Minimum concentration of compound required for complete inhibition of Ps. aeruginosa in emulsion.

| Compound No. | (Mcg./ml.) | | | |
| --- | --- | --- | --- | --- |
| | Week 1 | Week 2 | Week 3 | Week 4 |
| I | 1.9 | 7.8 | 31.25 | 31.25 |
| II | 1.9 | 1.9 | 7.8 | 7.8 |

EXAMPLE 2

Deterioration of adhesives particularly starch-base adhesives not containing preservatives, is commonly encountered in practice. Efficacy as a starch-base adhesive was demonstrated by inoculation of a 6% solution of corn starch, partially hydrolyzed by holding at 100° C. for five minutes. In order to insure good growth of the test organisms, the starch-base was fortified with nutrients to contain 0.1% each of malt extract (Difco) and peptone (Difco). Trace elements (see page 33, "Theory and Practice in Experimental Bacteriology," G. C. Meynell et al., Cambridge University Press, 1965) were also added to enhance conida production in the case of higher fungi. The active compounds, I and II, were added separately to the substrate by weighing directly to a dry sterile container followed by the addition of 0.5 ml. of dimethylformamide to dissolve the compound. Fifty grams of nutrient adhesive were then added, at 60° C., mixed to distribute the compound, and, four equal aliquots poured into four sterile containers. Each sample preparation was then inoculated with Ps. aeruginosa, Bacillus subtilis (spores), Aspergillus niger and Penicillium piscarium. The concentration range of compound tested was from 0.2–0.05% w./w.

Observations to determine protection of the test substrate against development of the organisms except Ps. aeruginosa were made macroscopically at the end of four weeks incubation. Deterioration by B. subtilis was recognized by substrate hydrolysis and yellow pigment production. P. piscarium produced abundant mycelial development; A. niger produced abundant mycelial development as well as substrate hydrolysis. The presence of Ps. aeruginosa was determined by streaking substrate onto the surface of trypticase glucose extract agar (B.B.L.) plates containing 0.005% triphenyltetrazolium chloride. Responses were recorded at the end of the incubation period and it was found that the two active compounds of this invention (I and II) were effective at the 0.05%, the lowest concentration tested.

EXAMPLE 3

Cosmetic products, particularly those containing nonionic emulsifying agents, are quite susceptible to the growth of microorganisms.

Complete descriptions and formulations of cosmetic products are well known to those skilled in the art and can be found in Sagarin, E., Cosmetics-Science and Technology, Interscience Publishers, Inc. N.Y. (1957). The problems encountered in the preservation of cosmetic products are described in Lawrence and Black, "Disinfection, Sterilization and Preservation," chapter 35, Lea and Febiger, Phila., (1968). The compounds of our invention are very effective preservatives for cosmetic products and are especially advantageous in formulations containing nonionic surfactants which are known to nullify the antimicrobial properties of most of the known preservatives. Our compounds can be added to the cosmetic products by direct addition of the solids, by dissolving them in the oil phase of the formulation as a solid or dissolved in solvents such as alcohol or acetone.

To demonstrate use and activity, the compounds were weighed directly to sterile containers. Six grams of oil base having the composition set forth below without the water, were separately added to dissolve the active compounds, I and II, warmed to 50° C. and 94 ml. distilled water at 50° C. added to the base, to form a lotion. In order to insure good development of all test organisms the finished emulsion was fortified with nutrient to contain 0.1% each of peptone (Difco) and malt extract (Difco). Trace elements were also added as in Example 2 to enhance conidia production. The finished emulsion composition was as follows:

|  | G. |
|---|---|
| Stearic acid | 1.4 |
| Mineral oil | 2.3 |
| Arlacel 60 sorbitan monostearate | 0.7 |
| Tween 60 polyoxyethylene sorbitan monostearate | 1.6 |
| Distilled water | 94.0 |

Arlacel 60 is the trademark of Atlas Chemical Industries.

Tween 60 is the trademark of Hercules Chemical Co.

The 50° C. lotion was allowed to cool to room temperature and equal aliquots poured into four sterile containers. Each container was inoculated with its respective test organism. Sample preparations were inoculated with *Ps. aeruginosa*, *A. niger*, *A. flavus* and *P. piscarium*—microorganisms frequently found as contaminants in cosmetic products.

Observations to determine protection of the test substrate were made at weekly intervals. Except for *Ps. aeruginosa*, all observations were macroscopic and failure noted by abundant mycelial and conidial development in the case of failure to protect the substrate. The presence or absence of *Ps. aeruginosa* was determined by streaking one 4 mm. loopful onto the surface of trypticase glucose extract agar (B.B.L.) plates containing 0.005% triphenyltetrazolium chloride.

Responses were recorded at the lowest concentration of test compound (0.2, 0.1, 0.05%) protecting the substrate when the test was terminated at the end of four weeks incubation. Both compounds (I and II) were effective at the lowest concentration tested, i.e., at 0.05%.

The effectiveness as preservatives of compounds I and II in other cosmetic preparations is demonstrated by the following test.

The cosmetic preparations tested had the following components.

Formula A:

|  | Parts by wt. |
|---|---|
| Tetrahydrosqualene | 5.2 |
| Lecithin (Alcolec 4135) | 1.6 |
| Polyethyleneglycol monostearate (M.W. 400) | 2.1 |
| Cetyl alcohol | 1.1 |
| Water | 90.0 |

Alcolec 4135 is a trademark of American Lecithin Co.

Formula B:

|  | Parts by wt. |
|---|---|
| Stearic acid | 3.0 |
| Tween 60 | 2.9 |
| Lanolin (Amerchol L-101) | 6.0 |
| Acetylated lanolin (Modulan) | 2.0 |
| Sorbitan monostearate (Span 60) | 2.1 |
| Water | 84.0 |

Americhol L-101 and Modulan are trademarks of American Cholesterol Products Inc.

Span 60 is the trademark of Atlas Chemical Industries.

Formula C:

|  | Parts by wt. |
|---|---|
| Mineral oil | 35.0 |
| Arlacel 60 | 2.0 |
| Tween 60 | 3.0 |
| Lanolin | 10.0 |
| Glycerol monostearate (Arlacel 60) | 17.0 |
| Water | 33.0 |

Formula D:

| Mineral oil | 30.0 |
|---|---|
| Cetyl alcohol | 1.0 |
| Amerchol L-101 | 5.0 |
| Arlacel 165 | 4.0 |
| Polyoxyethylene derivative of lanolin-acetylated (Solulan 98) | 2.0 |
| Glycerol | 4.0 |
| Water | 54.0 |

Solulan 98 is a trademark of American Cholesterol Products Inc.

The test was carried out by adding, separately, to the non-aqueous parts of these formulations 1 ml., ½ ml., and ¼ ml. of alcoholic solutions containing 20.0% by weight of the active compounds (I and II). Thus 10 grams of Formula A (non-aqueous part), 16 grams of Formula B (non-aqueous part), 67 grams of Formula C (non-aqueous part) and 46 grams of Formula D (non-aqueous part) were used. Water was added in the amounts set forth in the above formulations.

The microbiological tests employed in connection with the preceding part of this example were used to test the effectiveness of Compounds I and II in Formulas A, B, C and D. The results were the same as above; both compounds were effective at the lowest concentration tested, i.e.. 0.05%.

EXAMPLE 4

Microbial development in fuel oil systems resulting in sludge formation in the aqueous phase at the bottom of the tanks has been of concern to the petroleum industry. Gram negative bacteria in particular have been held responsible and, in addition, are known as hydrocarbon-oxidizing bacteria leading to hydrocarbon degradation.

The prevention of the development of *Ps. aeruginosa* in a two phase oil-water system was demonstrated by incorporating Compounds I and II into fuel oil as aliquots of concentrated solutions in dimethylformamide. The oil was #6 Fuel Oil, Metropolitan Petroleum Company, maximum 1% sulphur. high pour, 1480, 800 B.t.u. per gallon. Serial dilutions of the oil were then made to give two fold descending concentrations of the compound in oil. Aliquots of 5 ml. of oil-containing compound were then added to 20 ml. Bushnell-Haas medium (J. Bact. 41, (5) 653–673 (1941). Samples were inoculated with one drop of (0.05 ml.) of a 1–1,000 distilled water dilution of a 24 hours A.O.A.C. broth culture of *Ps. aeruginosa*. Observations for survival were made at the end of 20 days incubation at 28° C. by streaking the aqueous phase onto the surface of trypticase glucose extract agar (B.B.L.) plates containing 0.005% triphenyltetrazolium chloride. All controls yielded isolation of the test organism. No samples containing the compounds of our invention permitted survival of the organism. The range of concentration tested was from 312 mcg./ml. to 1.25 mcg./ml. in the oil.

EXAMPLE 5

The magnitude of activity of these compounds is such aaginst unicellular algae that they would be of utility in industrial water systems where algae posed problem. Activity against *Chlorella vulgaris* was determined by inoculation of peptone-glucose broth containing the compound at concentrations from 10 to 1 mcg./ml. Inoculated broth samples were incubated for 30 days at 25° C. over 150 ft. candle illumination. Response criterion was recorded as growth or complete inhibition at the end of the incubation period. Compounds were added to the broth from an alcoholic (methanol) solution of the test compound. The two compounds (I and II) gave complete inhibition at the lowest concentration tested.

EXAMPLE 6

The growth of microorganisms, especially the anaerobe, *Desulfovibrio desulfuricans*, in flood waters used in secondary oil recovery presents serious problems to the petroleum industry. These problems are discussed in Meyers & Slabgi, "The Microbiological Quality of Injection Water Used in Alberta Oil Fields," Producers Monthly, 12, May (1962). The addition of antimicrobial compounds which are active at very low concentrations provides a satisfactory solution to this problem. A recommended procedure for determining the effectiveness of a chemical in this application is to test the activity of the chemical against selected bacteria. (See API Recommended Practice for Biological Analysis of Subsurface Injection Water, American Petroleum Institute, New York.) The activity of bromonitrostyrene (II) was tested against *D. desulfuricans* under anaerobic conditions using Difco API sulfate reducer broth. Tests against other bacteria were conducted by agar dilution technique in dextrose tryptone extract agar plates. The compound was added to the media as dilutions of a solution in dimethyluformamide. The activity of the compound, tabulated below, attests to its usefulness as a biocide in this application. The chemical can be dissolved in the various aliphatic and aromatic solvents described in this application and added to flood water systems in this dissolved condition.

| Organism: | Inhibitory conc. (mcg./ml.) |
|---|---|
| Desulfovibrio desulfuricans (A.P.I.) | 2.75 |
| Escherichia coli | 22.0 |
| Pseudomonas aeruginosa | 5.5 |
| Proteus vulgaris | 11.0 |
| Bacillus cereus (A.P.I.) | 22.0 |
| Pseudomonas fluorescens (A.P.I.) | 22.0 |

Similar results can be obtained in analogous test with the dibromonitroethyl benzene I. Our compounds can be added to the flood waters dissolved in various organic solvents such as acetone, dimethylformamide, dioxane, alcomifiamdor 1t____AplheytETAOINetaoETAOINETAOIN hol, etc.

EXAMPLE 7

Acrylic emulsions are generally quite susceptible to growth of gram negative bacteria. Compounds I and II serve effectively in reducing or eliminating gram negative bacterial contamination in acrylic emulsion systems. For example, 1,4-dioxane solutions of Compounds I and II were placed into "Rhoplex B-15" acrylic emulsion (Rohm & Haas Co.) at varying concentrations and inoculated with *Ps. aeruginosa* and *Escherichia coli*. Samples were placed on a mechanical shaker and incubated at 28° C. Surviving bacteria were determined onto the surface of trypticase glucose extract agar (B.B.L.) plates. No bacteria weer recovered from emulsion samples containing 37.5 mcg./ml. in the case of *Ps. aeruginosa* and none from samples containing 75 mcg./ml. in the case of *E. coli*.

EXAMPLE 8

Microbial growth in pulp and paper manufacturing or papermill water sytsems presents a major problem to that industry. The application of effective antimicrobials to these systems, often called white water systems, is necessary to avoid the problems and economic losses due to the microorganisms. Papermill water systems normally contain up to 15% of cellulosic fiber material and present favorable conditions for microbial growth. A detailed description of these systems is presented in U.S. Pat. 3,397,14.

To demonstrate the activity of the active compounds in a simulated white water system, a slimicide test suggested in "Microbiology of Puly and Paper, TAPPI Monograph Series, No. 15," was used. Bromonitrostyrene (II) was dissolved in dimethylformamide and constant volumes of suitable dilution levels were added to flasks containing 24 ml. of the following substrate:

8.4 g. Whatman No. 2 powdered cellulose
2.6 g. sodium nitrate
1.0 g. calcium sulfate
6.5 g. maltose
1.0 g. nutrient broth, Difco
10.0 ml. 2% mersize RM 70R (Monsanto)
2.5 ml. 2% alum
990 mol. distilled water Using pure culture technique, the flasks were inoculated with 1 drop of an 18-24 hour nutrient broth culture of bacteria and an aqueous conidia suspension of fungi grown on potato dextrose agar. The flasks were agitated continuously on a gyratory shaker at 28° C. The presence of bacterial growth was determined after 3 day incubation by streaking onto dextrose tryptone extract agar plates. Fungal growth was detected visually after 7 day incubation. Control flasks included in these tests showed heavy growth of the organisms during this incubation period. The results listed below are the minimum concentration of the compound that completely inhibited growth.

| Organism: | Inhibitory conc. (mcg./ml.) |
|---|---|
| Pseudomonas aeruginosa | 1.9 |
| Aerobacter aerogenes | 0.95 |
| Aspergillus niger | 0.95 |
| Penicillium piscarium | 1.9 |

Substantially the same results were obtained when compound I was substituted for II in the foregoing example.

EXAMPLE 9

Cooling towers are widely used in industry for cooling and recirculating large quantities of water used in heat exchange operations. The problems of microbial growth in these systems causing slime formations which markedly impair the efficiency is well known and is described in Betz Handbook of Industrial Water Conditioning, Betz Laboratories Inc., Philadelphia, Pa.

The compounds of our invention effectively inhibit the growth of microorganisms in cooling tower water as shown by the following tests. A sample of cooling tower water was taken from an installation which had been in operation in a chemical plant wherein a variety of organic chemicals was manufactured for several years. The installation consisted of a two cell induced draft double flow tower and accessory equipment designed to cool 2,400 gallons per minute from 95° F. to 85° F. It was composed of redwood structural members with plastic fill and had a capacity of about 10,000 gallons. The water sample was divided into three equal 150 ml. aliquots and a dimethylformamide solution of bromonitrostyrene added to two of the samples to give concentrations of 5.0 and 10.0 parts per million respectively of II by weight of the water. Dimethylformamide alone was added to the third sample which served as a control. The total aerobic bacterial count of the samples was determined immediately and after 24 hours incubation on a gyratory shaker by standard plating methods results are listed in the table below:

| | Counts per ml.$^{-1}$ | | |
|---|---|---|---|
| Concentration of II (p.p.m.) | 0 | 5 | 10 |
| Incubation period, hrs.: | | | |
| 0 | 189,000 | 183,000 | 250,000 |
| 24 | 203,000 | 60 | <10 |

Substantially the same results were obtained when I was used in place of II in the foregoing example.

EXAMPLE 10

Emulsion paints, often termed latex or water-based paints, are subject to microbial deterioration during storage. An adequate description of these paints is found in the Rohm & Haas Company's brochure "Rhoplex acylic emulsions for outdoor paints," 11th Annual Progress Report. The in-can spoilage of emulsion paints is most frequently attributed to the growth of gram negative bacteria which can produce noxious odors, gas formation, discoloration, and complete destruction of the emulsion.

The compounds of our invention (I and II) are effective preservatives for these paints as demonstrated by the following tests. The test paint was an acrylic emulsion house paint, Rohm and Haas Formulation #306 (no preservative). Two fold serial dilutions of 6.0% solutions of compound I in dimethylformamide (DMF) were made with DMF. Aliquots (0.5 ml.) of these dilutions were added to 20.0 g. samples of the paints and the paints were inoculated with a broth culture of *Pseudomonas aeruginosa*, a gram negative bacteria found in spoiled paints. The survival of the bacterial in the samples was determined by swab streaking onto dextrose tryptocase extract agar, .01 ml. of the paints initially and after 24 and 48 hours incubation at ambient temperatures. Results are listed in the table below.

| Concentration of compounds (p.p.m.) | Incubation period (hours) | | |
|---|---|---|---|
| | 0 | 24 | 48 |
| 705 | + | − | − |
| 375 | + | − | − |
| 188 | + | − | − |
| 94 | + | − | − |
| 47 | + | + | − |
| 23 | + | + | + |

NOTE.—+ denotes recovery of test organism. − denotes no recovery of test organism.

Substantially the same results were obtained when II was used in place of I in the foregoing test of this example.

It is understood that the term "aqueous" as used herein to denote compositions which can be preserved in accordance with the present invention is used in a broad sense and is not limited to solutions but also includes suspensions, emulsions and all compositions which contain water in amounts sufficient to render the compositions susceptible to degradative attack by microorganisms.

What is claimed is:

1. The process for combatting spoilage caused by the action of micro-organisms, particularly *Pseudomonas aeruginosa* in aqueous emulsion compositions normally subject to such spoilage, which comprises inhibiting said organisms in such compositions with an effective inhibiting amount of β-bromo-β-nitro-styrene, said amount after 2–4 weeks being less than the minimal effective inhibiting concentration required for 1,2-dibromo-2-nitroethyl benzene against said microorganisms in said compositions.

2. The process as set forth in claim 1, wherein the metabolizable composition is a cutting oil in water emulsion subject to spoilage by *Pseudomonas aeruginosa*.

3. The process as set forth in claim 1, wherein the metabolizable composition is a cosmetic composition containing non-ionic surfactants which are known to nullify the antimicrobial properties of most known preservatives.

4. The process as set forth in claim 1, wherein the metabolizable composition is an acrylic emulsion paint.

5. The process set forth in claim 1, wherein the metabolizable composition is a starch-base adhesive.

6. The process set forth in claim 1, wherein the metabolizable composition is fuel oil.

References Cited

UNITED STATES PATENTS

| 2,189,570 | 2/1940 | Schechter et al. | 167—30 |
| 2,335,384 | 11/1943 | Bousquet et al. | 167—22 |
| 2,343,415 | 3/1944 | Kaufert | 167—300 |
| 2,987,479 | 6/1961 | Bennett | 252—51.5 |
| 3,024,159 | 3/1962 | Bollenback et al. | 162—161 |
| 3,300,373 | 1/1967 | Wolfson. | |

FOREIGN PATENTS

| 832,656 | 1/1952 | Germany. |
| 49/22,732 | 10/1964 | Japan. |

OTHER REFERENCES

Timbal, Antibiotics & Chemotherapy, vol. 8, pp. 93–98 (1958).

Nature, vol. 200 (4902), p. 171 (1963).

Sagarin, Cosmetics, Science & Technology, pp. 1036–37 (1957).

Chem. Abstracts Subject Index (1435s) (1965).

Chem. Abstracts, sec. 13432(i), vol. 55 (1961).

SHEP K. ROSE, Primary Examiner

U.S. Cl. X.R.

71—67; 106—15; 162—161, 190; 210—64